(12) United States Patent
Liao et al.

(10) Patent No.: US 9,288,071 B2
(45) Date of Patent: Mar. 15, 2016

(54) METHOD AND APPARATUS FOR ASSESSING QUALITY OF VIDEO STREAM

(75) Inventors: Ning Liao, Beijing (CN); Zhibo Chen, Beijing (CN); Xianlei Wang, Beijing (CN)

(73) Assignee: THOMSON LICENSING, Issy les Moulineaux (FR)

(*) Notice: Subject to any disclaimer, the term of this patent is extended or adjusted under 35 U.S.C. 154(b) by 628 days.

(21) Appl. No.: 13/695,058

(22) PCT Filed: Apr. 30, 2010

(86) PCT No.: PCT/CN2010/000603
§ 371 (c)(1),
(2), (4) Date: Oct. 29, 2012

(87) PCT Pub. No.: WO2011/134113
PCT Pub. Date: Nov. 3, 2011

(65) Prior Publication Data
US 2013/0044224 A1    Feb. 21, 2013

(51) Int. Cl.
*H04L 12/725* (2013.01)
*H04L 12/24* (2006.01)
(Continued)

(52) U.S. Cl.
CPC ............ *H04L 12/24* (2013.01); *H04L 65/4076* (2013.01); *H04L 65/80* (2013.01); *H04N 17/004* (2013.01); *H04N 19/154* (2013.01); *H04N 19/196* (2013.01); *H04N 19/46* (2013.01);
(Continued)

(58) Field of Classification Search
CPC ............................ H04L 67/10; H04L 41/5009
See application file for complete search history.

(56) References Cited

U.S. PATENT DOCUMENTS

2005/0114887 A1   5/2005   Gelissen
2006/0221942 A1  10/2006   Fruth et al.
(Continued)

FOREIGN PATENT DOCUMENTS

CN   1640139     7/2005
CN   101601266  12/2009
(Continued)

OTHER PUBLICATIONS

Tao, Shu, John Apostolopoulos, and Roch Guérin. "Real-time monitoring of video quality in IP networks." IEEE/ACM Transactions on Networking (TON) 16.5 (2008): 1052-1065.*
(Continued)

*Primary Examiner* — Sath V Perungavoor
*Assistant Examiner* — Clifford Hilaire
(74) *Attorney, Agent, or Firm* — Tutunjian & Bitetto, P.C.

(57) ABSTRACT

Objective video quality assessment models at media-layer or at packet-layer are known for estimating audio/video quality of experience. Existing models are not able to provide stable performance. A method for enabling quality assessment of a stream of frames of video data comprises receiving a sequence of packets, generating a set of parameters and inserting said generated set of parameters as side information into said stream of frames, wherein at least one parameter refers to a video slice level. A method for assessing the quality of a stream of frames of video data comprises receiving a sequence of packets, extracting a set of parameters from said sequence of packets and generating an estimated mean opinion score, wherein the video data comprise a slice level and wherein the extracted set of parameters comprises at least one parameter that refers to a video slice level.

32 Claims, 2 Drawing Sheets

(51) Int. Cl.
  *H04N 17/00* (2006.01)
  *H04N 21/435* (2011.01)
  *H04N 21/6437* (2011.01)
  *H04L 29/06* (2006.01)
  *H04N 19/46* (2014.01)
  *H04N 19/196* (2014.01)
  *H04N 19/61* (2014.01)
  *H04N 19/154* (2014.01)
  *H04N 19/86* (2014.01)
  *H04N 19/895* (2014.01)

(52) U.S. Cl.
  CPC ............... *H04N19/61* (2013.01); *H04N 19/86* (2013.01); *H04N 19/895* (2013.01); *H04N 21/435* (2013.01); *H04N 21/6437* (2013.01)

(56) References Cited

U.S. PATENT DOCUMENTS

| | | | |
|---|---|---|---|
| 2008/0095246 A1* | 4/2008 | Luo et al. | 375/240.27 |
| 2009/0041114 A1 | 2/2009 | Clark | |
| 2010/0053300 A1 | 3/2010 | Einarsson et al. | |
| 2010/0053335 A1 | 3/2010 | Hong et al. | |
| 2010/0061446 A1* | 3/2010 | Hands et al. | H04N 19/196 375/240.02 |
| 2010/0080327 A1 | 4/2010 | Zhang et al. | |
| 2011/0013694 A1 | 1/2011 | Watanabe et al. | |
| 2011/0026585 A1 | 2/2011 | Watanabe et al. | |
| 2011/0085605 A1 | 4/2011 | Xie et al. | |
| 2012/0020415 A1 | 1/2012 | Yang et al. | |

FOREIGN PATENT DOCUMENTS

| | | |
|---|---|---|
| CN | 101635846 | 1/2010 |
| EP | 1727375 | 11/2006 |
| EP | 1995978 | 11/2008 |
| EP | 2018069 | 1/2009 |
| EP | 2077672 | 7/2009 |
| EP | 2106153 | 9/2009 |
| EP | 2252073 | 11/2010 |
| EP | 2257077 | 12/2010 |
| JP | 2009159462 | 7/2009 |
| JP | 2010515292 | 5/2010 |
| JP | 2010515392 | 5/2010 |
| JP | 2011510562 | 3/2011 |
| WO | WO200881185 | 7/2008 |
| WO | WO2009012302 | 1/2009 |
| WO | WO2009116666 | 9/2009 |
| WO | WO2009116667 | 9/2009 |

OTHER PUBLICATIONS

Naccari, Matteo, Marco Tagliasacchi, and Stefano Tubaro. "No-reference video quality monitoring for H. 264/AVC coded video." Multimedia, IEEE Transactions on 11.5 (2009): 932-946.*

Tao, Shu, John Apostolopoulos, and Roch Guérin. "Real-time monitoring of video quality in IP networks." IEEE/ACM Transactions on Networking (TON)16.5 (2008): 1052-1065.*

Lee et al., "Objective Mobile Video Quality Evaluation Method based on Region of Subjective Interest", Dept. of Computer Engineering, Kwangwoon University, Aug. 24, 2007, pp. 11-19.

Naccari M., "No-Reference Video Quality Monitoring for H.264/AVC Coded Video", IEEE Trans. on Multimedia, Aug. 5, 2009, pp. 932-946.

Sung et al., "Realtime No-Reference Quality-Assessment Over Packet Video Networks", School of Information & Communication Eng., Sungkyumkwan Univ., Apr. 14, 2009, pp. 387-396.

Mu et al., "Visibility of individual packet loss on H.264 encoded video streams: A user study on the impact of packet loss on perceived video quality", Proceedings of SPIE Multimedia Computing and Networking, Jan. 19, 2009, pp. 1-14.

Raake et al., "T-V-Model: Parameter-Based Prediction of IPTV Quality", International Conference on Acoustics, Speech, and Signal Processing, Las Vegas, Nevada, USA, Mar. 30, 2008, pp. 1149-1152.

Takahashi et al.; "Framework and Standardization of Quality of Experience (QoE) Design and Management for Audiovisual Communication Services", NTT Technical Review, vol. 7, No. 4, Apr. 2009, pp. 1-5.

Winkler et al., "The Evolution of Video Quality Measurement: From PSNR to Hyprid Metrics", IEEE Transactions on Broadcasting, vol. 54, No. 3, Sep. 1, 2008, pp. 660-668.

Shu et al., "Real-Time Monitoring of Video Quality in IP Networks", IEEE/ACM Transactions on Networking, vol. 16, No. 5 ), Oct. 1, 2008, pp. 1052-1065.

* cited by examiner

METHOD AND APPARATUS FOR ASSESSING QUALITY OF VIDEO STREAM

FIELD OF THE INVENTION

This invention relates to a method and an apparatus for assessing the quality of a video stream. The invention relates also to a method and an apparatus for enabling quality assessment of a video stream.

BACKGROUND

With the development of Internet Protocol (IP) networks, video communication over wired and wireless IP network (e.g. IPTV service) has become very popular. Unlike traditional video transmission over cable network, video delivery over IP network is much less reliable. The situation is even worse in the environment of wireless networks. Correspondingly, one recent requirement for video quality modelling (VQM) is to rate the quality degradation caused by IP transmission impairment, e.g. packet loss, delay, jitter, except those caused by video compression. Current research addresses objective video quality assessment models at media-layer or at packet-layer for estimating audio/video quality of experience (QoE)[i]. Quality is usually expressed as a mean opinion score (MOS) value. Media-layer models use media signals, such as speech waveform or video pixel data. Packet-layer models use only packet header information, and may help in automatic network diagnosis to guarantee user experience. It is a light-weight model as compared to the media-layer model, thus suitable for real-time monitoring and for easy deployment in customer devices (e.g. STBs).

[i] Akira Takahashi: Framework and Standardization of Quality of Experience (QoE) Design and Management for Audiovisual Communication Services, NTT Technical Review 4/2009, www.ntt-review.jp/archive/2009/200904.html Currently known objective packet-layer models use packet information as input parameters, e.g. packet loss rate, timestamp in RTP header and packet size. These input parameters are video content independent. However, a loss of different part of video content arouses different perceptual degradation. This is a shortage of the existing packet-layer VQM that affects its performance in terms of estimation accuracy and robustness.

A further problem of the existing models is that the effect of error concealment (EC) is not fully taken into account. The impact of a lost packet on visual quality depends significantly on the error concealment methods employed in the decoder, in addition to the encoder configuration. Though a known VQM model[ii] uses two model coefficients, depending on the employed packet-loss concealment scheme, the two model coefficients $b_0$ and $b_1$ are fixed for given scheme. A similar model uses fixed EC weights for a given EC scheme employed in a decoder, wherein the value of the EC weights is set empirically. However, it has been observed that setting a fixed EC weight for each decoder is far from approximating the actual effect of EC.

[ii] A. Raake, M.-N. Garcia, S. Möller J. Berger, F. Kling, P. List, J. Johann, C. Heidemann, T-V-MODEL: PARAMETER-BASED PREDICTION OF IPTV QUALITY, ICASSP 2008

Further, in packet based networks the coded bits of a video frame may be encapsulated into several packets, such as RTP packets, depending on the maximum transmission unit (MTU) size of the underlying network. For H.264 encoder, a video frame may be encoded into several slices. For transmission, data of a slice may be encapsulated in several RTP packets, or several slices may be encapsulated in one RTP packet, or one slice is used per packet, depending on MTU size. Thus, the relationship between the statistics features of packet loss and MOS is not stable. Therefore the existing models are not able to provide stable performance due to limitation of only considering statistics features of packet loss and MOS.

SUMMARY OF THE INVENTION

It has been found that setting a fixed EC weight for each decoder is not sufficient, because different EC methods may be applied to different slices in a decoder. Besides, in real-world applications, one H.264 encoded video frame may be encoded into several slices, and the loss of different slice may result in very different degree of visible artefacts after EC in a decoder. Thus, the approach of applying different EC weight at decoder level has been further refined.

The present invention provides a refined solution for at least the above-mentioned problems.

A method for enabling quality assessment of a stream of frames of video data is disclosed, wherein the video data are transmitted via a packet network and each frame of video data is represented by a variable number of packets. The method comprises steps of receiving a sequence of packets associated with the stream of frames of video data, generating a set of parameters from said sequence of packets, the set of parameters being suitable for generating an estimated mean opinion score for the stream of frames of video data, and inserting said generated set of parameters as side information into said stream of frames. The video data comprise a slice level, and the generated set of parameters comprises at least one parameter that refers individually to the slice level of the video.

Further, a method for assessing the quality of a stream of frames of video data is disclosed, wherein the video data are transmitted via a packet network and each frame of video data is represented by a variable number of packets. The method comprises steps of receiving a sequence of packets associated with the stream of frames of video data, extracting a set of parameters from said sequence of packets, and generating an estimated mean opinion score based on said set of parameters. The video data comprise a slice level, and the extracted set of parameters comprises at least one parameter that refers individually to the slice level of the video.

An apparatus suitable for implementing the method for enabling quality assessment is disclosed in claim 14, and an apparatus suitable for implementing the assessing method is disclosed in claim 15.

Further, one embodiment of the present invention is a computer executable program for a video quality estimation device, causing a computer of the device to execute said method for enabling quality assessment and/or said method for assessing the quality of a stream. Another embodiment is a computer readable recording medium having recorded thereon said computer executable program.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the structure of a conventional packet-layer model.

DETAILED DESCRIPTION OF THE INVENTION

Figure 1:
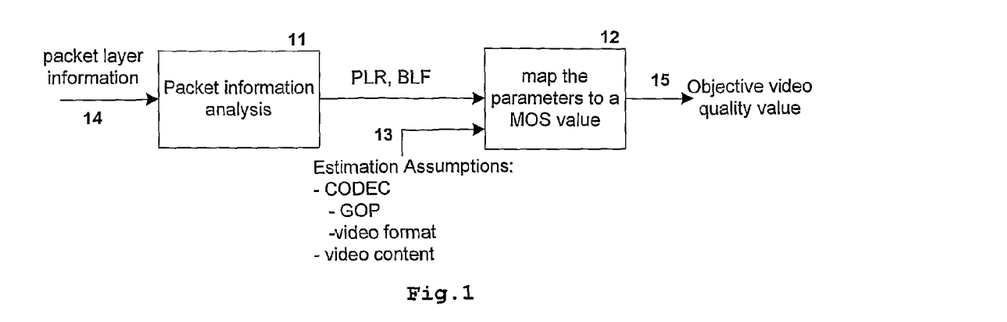

Traditionally, as shown in FIG. 1, the input of a video quality assessment model is packet header information of a packet stream 14 and encoder configuration information 13. After packet information analysis 11, analysis data like packet-loss rate PLR and burst loss frequency BLF are provided for mapping 12 them to an objective video quality value 15, which is an estimated score of the video quality (i.e. Mean Opinion Score MOS). The encoder configuration information 13 is based on assumptions, namely codec type, group-of-picture (GOP) structure, video format (as obtained from transport packet headers) and some video content features, e.g. pixel data.

With respect to the above-mentioned problems of the existing packet-layer VQM models, the present invention can improve the accuracy and robustness of the packet-layer VQM model, and simultaneously maintain low computational complexity. This is advantageous in particular for real-time video quality monitoring.

The present invention is described exemplarily based on the following implementation embodiments.

First, exemplary side information syntax is defined for each video slice, and for each group of picture (GOP) or each scene group or slice group. The terms "scene group" and "slice group" will be interpreted below.

Figure 2:
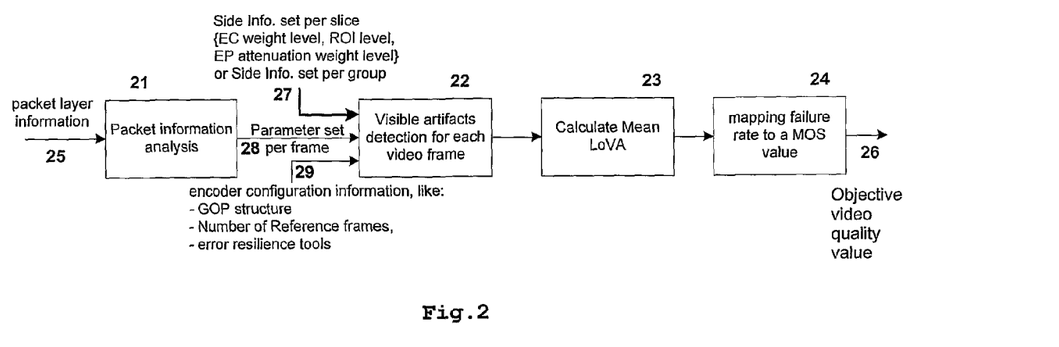
FIG. 2 a block diagram of the present invention.

Second, the defined side information is used as input of a novel packet-layer video quality assessment model, as shown in FIG. 2. As a result, the defined side information may serve for improving the model performance in terms of estimation accuracy and robustness. For example, the side information is used to guide the setting of EC weight value and error propagation (EP) weight value in the packet-layer VQM, which therefore overcomes the aforementioned shortages. On the other hand, the overhead for side information will be kept as small as possible. With the described side information, a significant improvement of quality estimation accuracy can be achieved even if only two or three levels need to be transmitted.

As mentioned above, there are three general categories of objective video quality modelling, depending on the inputs: packet-layer models, bitstream-level models, and media-layer models. Media-layer models work in the pixel domain. Parametric packet-layer models are based on packet header information, network parameters (e.g. bandwidth, packet loss rate, delay, etc.), and encoder configuration information. Bitstream-level models are hybrid models based on half-decoded video bitstream information and packet header information as well. Reduced-reference media-layer models have been proposed e.g. for ITU standard ITU-T Rec. J.246. However, there exists no reduced-reference model for packet-layer models yet.

In the scheme of the present invention, side information set for each slice in the coded bit stream or side information set for each group is also used as input. The output of the model is a MOS value.

It is worth mentioning the difference between the side information syntax for each video slice (which is encapsulated into one packet) of the present invention and the priority level for each video packet. The latter is a traditional method to differentiate the importance of packets according to different encoded frame type (e.g. IDR/I/P/B frame), so that the network in congestion can discard packets more smartly in an effort to provide end user with as good video quality as possible. The proposed type of side information is different from frame types, and the information reflects the decoder's EC effect, visual importance (or Region of Interest, ROI), and error propagation (EP) attenuation rate of a video slice. This information can significantly improve the performance of packet-layer VQM, and also maintain the light-weight feature of packet-layer model, introducing only very low overhead of transmission.

FIG. 2 shows a functional block diagram of the present invention. A packet information analysis block 21 uses RTP/UDP header information 25 to get a set of parameters for each frame. E.g. for an H.264/AVC encoder, the parameter set per frame (for a frame with index i) 28 includes the number of total slices $N_{i,total}$ the number of lost slices $N_{i,lost}$, and the index of lost slices in the video frame. It is important that the statistics of "slice" information are used instead of "packet" information. A frame may be encoded into one or more slices, according to an encoder configuration. E.g. one macroblock (MB) row in a frame may be a slice, or a slice may be set so that its size is not larger than the MTU size. A slice is an independent decoding unit. In real-world video transmission, the data of a slice may be encapsulated into one or more RTP packets, depending on the MTU size of the underlying network. On the other hand, it is also possible that several slices of a frame are assembled into one RTP packet (as described in detail in RFC3984). If any packet of a slice is lost, the slice cannot be decoded properly and is regarded as lost. There is also another situation where a packet loss is detected, which corresponds to the loss of several slices of a frame. By analyzing NALU header per RFC3984, correctly received slices per frame can be identified. Finally, for identifying different frames, the timestamps in RTP packet headers are used.

In the visible artefacts detection block 22, the described side information set per slice 27, the calculated parameter set per frame 28 and the encoder configuration information 29 are used to calculate the "Level of Visible Artefacts" (LoVA) for each frame. For an ith frame, the LoVA is estimated by Eq. (1).

$$V_i = \frac{\sum_{j=1}^{N_{i,lost}} w_{i,j}^{location} \times w_{i,j}^{EC}(EC_i, SI_{i,j}, TI_{i,j})}{N_{i,total}} + \frac{\sum_{j=1}^{N_{i,total}} E_{i,j}^{propagate} \times w_{i,j}^{IR}}{N_{i,total}} \quad (1)$$

A proposed side information triplet is {EC weight level, ROI weight level, and EP attenuation level}, which is used to guide the setting of three weight coefficients in Eq. (1), as will be described below.

In the Mean LoVA (MLoVA) calculation block 23, the Mean LoVA (i.e. average LoVA) is calculated for a sequence of given time duration, e.g. t seconds. As is known from previous research[iii], the simple metric of mean time between visible artifacts has an average correlation of 0.94 with MOS.

[iii] Nitin Suresh, Mean Time Between Visible Artefacts in Visual Communications, PHD thesis, Georgia Inst. of Tech., August 2007

Therefore, the simple averaging method is used here as the temporal pooling method. That is, $$MLoVA = \left(\frac{1}{M}\sum_{i=1}^{M} V_i\right) / f_r \quad (2)$$

where M is the total number of frames in t seconds, and $f_r$ is the frame rate per second of the video sequence.

In the mapping block 24, the MLoVA is mapped to an objective MOS value according to a function that is e.g. trained using a curve fitting method, such as a least square curve fitting method.

In Eq. (1), different weights $w_{i,j}^{location}$ are assigned to lost slices, depending on the location of each lost slice in the frame. The weight can be set in the light of side information of the ROI level. There are two ROI levels for slices, tagged as "1" (slice contains a ROI) or "0" (no ROI in slice). Correspondingly, the weight $w_{i,j}^{location}$ is set to a larger value if the slice has a ROI, or to a smaller value otherwise, for differentiating their visual influence. In experiments it has been found advantageous if $w_{i,j}^{location}$ is e.g. doubled when ROI_level equals "1".

In Eq. (1), $w_{i,j}^{EC}(EC_i, SI_{i,j}, TI_{i,j})$ is the EC weight that reflects different EC effects of different lost slices. The EC effects of a lost slice depends not only on the EC method employed at the decoder and the slicing mode employed at the encoder, but also on the video content feature in the slice: a spatial complexity measure $SI_{i,j}$ and a temporal complexity measure $TI_{i,j}$. The value $w_{i,j}^{EC}$ is set in the light of side information of EC level: it is set to smaller or larger values to reflect the different EC effects of different slices and EC methods employed. In our experiment, for an inter-predicted slice, the $w_{i,j}^{EC}$ is set e.g. to 0.01, 0.3 and 0.6 corresponding to EC_level of 0, 1 and 2 respectively. For an intra-coded slice, the $w_{i,j}^{EC}$ is set to 0.01 or 2, corresponding to an EC_level of 0 or 1.

In Eq. (1), the $w_{i,j}^{IR}$ reflects degree of the attenuation of the propagated error. It is related to the ratio of intra coded MBs in the frame and the amount of predictive residue information. The value of $w_{i,j}^{IR}$ can be set in the light of the EP_level of the slices in the frame. The ratio of intra MB to the total number of MBs in the slice (denoted as $IRR_{i,j}$) can be obtained from EP_level value. Then in our experiment, $w_{i,j}^{IR}=1-IRR_{i,j}$. That is, $w_{i,j}^{IR}$ is set to reflect the intra MBs' role of stopping error from propagation.

In Eq. (1), $E_{i,j}^{propagate}$ denotes the amount of visible artefacts propagated from reference frames. The value depends largely on the encoder configuration information, i.e. the number of reference frames. In the experiment, the number of reference frames is two, and predicted (P-) and bi-directionally predicted (B-) frame types are used. The $E_{i,j}^{propagate}$ is calculated as $$E_{i,j}^{propagate} = \begin{cases} 0, & (I \text{ slice}) \\ a \times E_{1,j} + b \times E_{2,j}, & (P-, B-\text{slice}). \end{cases} \quad (3)$$

where $E_{1,j}$ and $E_{2,j}$ are stored artefacts values of two previous reference slices. a and b are weights for the propagated error from different reference frames, with a+b=1, a,b∈(0,1). In the experiment, a and b were set as a=0.9, b=0.1 for P-frames, and a=b=0.5 for B-frames.

In the following, an exemplary syntax for side information transmission is described.

One set of side information syntax is defined is at encoding slice level, as shown in Tab.1. A frame can be encoded into one or more slices in H.264/AVC. An encoding slice is a decoding unit independent of other slices of the frame. If a frame is encoded into several slices, one slice may contain e.g. one row of MBs.

In the present embodiment, the side information set includes {EC_level, ROI level, and EP attenuation level} for each video slice. The proposed side information set may include additionally the parameter size_in_MB, e.g. when a variable number of MBs is included in the slices of a frame. This may occur e.g. when a H.264/AVC encoder is configured to the slice mode of "fixed bytes per slice".

TABLE 1

Exemplary parameter set for slice level

| Syntax | Description | size |
| --- | --- | --- |
| param_set_for_slice { | | |
| EC_level | error concealment effects level | 2 bits |
| ROI_level | Region of Interest level | 1 bit |
| EP_attenuation_level | error propagation attenuation level | 4 bits |
| size_in_MBs | number of the MBs in current slice | max. 8 bits |
| } | | |

EC_level is the value of "error concealment level". This parameter reflects motion and/or texture complexity of the slice, and the EC method used. It can help measure the EC effects when the current slice is lost. Usually, two or three levels (corresponding to 2 bits) are enough.

ROI_level is the value of "Region of Interest level". It reflects whether the current slice content is region of perceptual interest, e.g., eyes and mouth. It can be coded in 1 bit.

EP_attenuation_level is the value of "error propagation attenuation level". This parameter reflects the different attenuation speed of the propagated error to the current slice or current frame. It is related to encoder configuration (e.g. intra refresh rate in H.264) and video content itself (e.g. amount of residue information after predictive coding). This parameter can be calculated once per encoding slice or once per frame. 4 bits (corresponding to 16 levels) are usually enough.

size_in_MB is the number of the MBs in a current slice. This parameter is useful only when a variable number of MBs is included in the slices of a frame. Its size depends on the frame size, usually 8 bits are sufficient.

If the auxiliary bandwidth is limited, the slice-level parameters may be transmitted selectively. In experiments we found that the EC_level helps improve performance most significantly. The second important information is ROI_level, and the third is the EP_level information. The last one is size_in_MBs, which is useful only when the varied number of MBs included in multiple slices of a frame. In one embodiment, there is only an EC_level parameter on slice level used. Further, as shown below, this parameter may (but needs not) be calculated by different formulas, depending on the slice, according to criteria like e.g. the prediction type of the slice (intra or inter) or the concealment type employed.

Generally, concealment methods fall into two types or categories: pixel-interpolation based methods and motion estimation based methods. The visual artefacts of the two types are different. Thus, it is advantageous to differentiate the EC effects of the two concealment types. The employed concealment type may also depend on the prediction type, e.g. in the JVT JM decoder.

Except the JVT JM non-real-time decoder, a widely used real-time decoder is the ffmpeg decoder. We found that, in the current version, the ffmpeg decoder can recover lost slices much better than the JVT decoder: in one embodiment, the decoder first determines if the frame with (a) lost slice(s) is intra-more-likely or not. If the frame is intra-more-likely, then the pixel-interpolation based method is used; otherwise, the motion estimation based method is used. Possible criteria for determining an intra-more-likely frame are:

(1) if there is no previous frame as a reference, then the current frame is an intra-more-likely frame;

(2) if the frame is an I-frame, calculate the absolute difference between the current frame and the immediately previous frame, based on correctly received MBs of the current frame. If the absolute difference is large, then the frame is more likely to be different from the previous frame, and thus should more likely use the intra pixel interpolation based method. In an exemplary implementation, define a variable is_intra_like for a frame, and increase it by the value of the absolute difference. Otherwise, i.e. if the absolute difference is small, calculate the absolute difference between the vertically adjacent MBs in the previous frame: if the difference is large, then the previous frame is more likely to have rich texture. Since this feature of the current frame is assumed to be similar in the current and the previous frame, the current frame is more likely to have rich texture. In this case, the current frame should not be concealed with the pixel-interpolation based method, since the pixel-interpolation based method is more suitable for smooth regions. In this case, decrease the variable is_intra_like by the value of the absolute difference. This procedure is repeated for all MBs of the frame. Finally, if the variable is_intra_like is larger than zero, the frame is judged to be intra-more-likely, and the pixel-interpolation based method will be used. Otherwise, the motion estimation based method will be used.

(3) if the frame is inter-predicted (i.e. P- or B-frame), calculate the variable is_intra_like based on correctly received MBs of the current frame. Increment is_intra_like if a MB is intra-coded, and decrement is_intra_like if the MB is inter-coded. If finally is_intra_like is larger than zero, then the frame is intra-more-likely, and the pixel-interpolation based method will be used. In other words, if the number of intra-coded MBs is larger than the number of inter-coded MBs, then the frame is judged as intra-more-likely, and the pixel-interpolation based method will be used. Otherwise, the motion estimation based method will be used.

In another embodiment, there is only the ROI_level parameter on slice level used.

Additionally, a second set of side information syntax can be defined at encoding GOP or scene group level. A scene group is a group of pictures between two adjacent scene changes. The encoding GOP structure may be aligned with scene group or not. Generally, the video content in a scene group has very different characteristics from that of its adjacent scene groups, but has similar characteristics within the group. If a frame is encoded into several slices, e.g. one slice contains one row of MBs, we refer to the slices in the same location of the frames in the group as slice group hereafter.

In one embodiment, a side information set also includes {Temporal Complexity Level, Spatial Complexity Level} for each encoding GOP or scene group. The proposed side information set may additionally include a ROI level parameter group_ROI_Level, when there are several slices in a frame, e.g. one MB row per slice. The group_ROI_level is calculated for each slice group.

TABLE 2

Parameter set on GOP level or scene group level

| Syntax | Description | size |
| --- | --- | --- |
| param_set_for_group{ | | |
| temporal_complexity_level | levels of overall motion in the group | 2 bits |
| spatial_complexity_level | levels of overall texture complexity of the group | 2 bits |
| group_ROI_level | indicates whether the group contains a ROI | 1 bit |
| } | | | temporal_complexity_level reflects the different levels of overall motion of the content in the GOP/scene group or slice group. Usually, 4 levels are enough.

spatial_complexity_level reflects the different levels of overall texture complexity of the content in the GOP/scene group or slice group. Usually, 4 levels are enough.

group_ROI_level is the value of "ROI level" of a slice group. This parameter is calculated only when there are several slices in a frame, e.g. one MB row per slice. The group_ROI_level is calculated for each slice group in the GOP or scene group.

The calculation of the above side information parameters is described in the following.

EC_level calculation

For an encoding slice, the "EC_level" may be calculated according to different EC methods. E.g. in H.264 reference decoder (also referred to as JVT decoder or JVT JM model), different EC methods are applied for inter-predicted slice and intra-predicted slice; therefore, in one embodiment different calculation methods are used for the two slice types. In the JVT decoder, an intra pixel interpolation method is used to conceal the MBs of a lost "intrapredicted" slice; temporal-domain motion vector estimation based error concealment method is used for the MBs of a lost "inter-predicted" slice. In some more advanced decoders, the two categories of EC methods are selected not according to the slice types, but according to other features of a slice. An example is given below. Other, similar calculation methods can be used.

For example in a JVT decoder, for each inter-predicted slice decode the slice and calculate the average motion vector (MV) of each MB by averaging the MVs of the 4×4 sub-blocks. If the MB is encoded in intra-prediction mode, then set its MV to the value of maximum motion search range. The MV in pixel unit is obtained instead of in sub pixel precision. This is a low-complexity method to obtain MVs of MBs. Alternatively, the MV of each MB can be calculated using other existing motion search methods. Denote the MV of ith-MB as $MV_i$. Sort the $MV_i$ in the slice in descendent order as:

$\{MV_j | MV_0 > MV_1 > \ldots > MV_{N-1}\}$, where N is the total number of MBs in the slice. The temporal complexity of the slice is calculated by averaging the top M MVs as:

$$TC = \frac{1}{M} \sum_{j=0}^{M-1} MV_j, M < N \quad (4)$$

In our experiment, M=3 or M=N/3. The EC_level of the slice is calculated as:

$$\text{EC\_level} = \begin{cases} 0, & TC \le 2(\text{pixel}) \\ 2, & TC > 10(\text{pixel}) \\ 1, & \text{others} \end{cases} \quad (5)$$

The rationale behind the EC_level calculation of interpredicted slices is that the EC effects vary significantly with the different temporal complexity of the corrupted slices. For stationary slices, it can be recovered without noticeable artefacts. However, for slices having large motion it is difficult to be error concealed, and there are usually serious edge distortions, which is perceptually very annoying.

For each intra-predicted slice, assume it is lost and its adjacent slices are correctly received. The pixel-domain interpolation EC method applied at JVT decoder is used to reconstruct the slice content. The perceptual distortion is calculated as $$D = \left( \frac{1}{M} \sum_{(j,k) \in I} D_{blk}^2(j,k) \right)^{1/2} \quad (6)$$

$$D_{blk}(j,k) = \max\left\{ \frac{\frac{1}{N}\sum_{l=0}^{N-1} |Y_{j,k}^{rec}(l) - Y_{j,k}^{ec}(l)|}{JND_{j,k}} - 1, 0 \right\} \quad (7)$$

where $Y_{j,k}^{rec}$ is the luminance component of the loss-free decoded MB indexed as (j,k), $Y_{j,k}^{ec}$ is the luminance component of the error concealed MB indexed as (j,k), M is the total number of MBs in the slice, N is the total number of pixels in a MB, $JND_{j,k}$ is a visibility threshold ("Just Noticeable Difference") of the MB, which can be calculated using known methods[iv]. The visible threshold is affected by such effects as spatial contrast sensitivity and luminance adaptation.

In an experiment, we only considered luminance masking effects and calculated it according to the empirical equation[4] with some modification:

[iv] e.g. in W. Lin et al., "Visual Distortion Gauge Based on Discrimination of Noticeable Contrast Changes", IEEE Transactions On Circuit and System for Video Tech., Vol. 15, No. 7, July 2005

$$JND_{j,k} = \begin{cases} g - \frac{g-h}{75} L_{j,k}, & \text{if } L_{j,k} \le 75 \\ \frac{f-h}{130} L_{j,k} + \frac{255}{130} h - \frac{125}{130} f, & \text{if } L_{j,k} \ge 125 \\ h, & \text{others} \end{cases} \quad (8)$$

where $L_{j,k}$ is the background luminance of a MB indexed as (j,k). It is calculated by averaging the luminance values of the pixels of the decoded MB. The parameters f,g,h may be selected as f=22, g=20, h=10. Then, the EC level of the slice can be calculated as:

$$EClevel = \begin{cases} 0, & D < Thrd \\ 1, & \text{others} \end{cases} \quad (9)$$

where Thrd is a constant and set to a small value near zero, e.g. 0.05.

The rationale behind the EC level calculation of intra-coded slices is that the quality degradation of slices that are error concealed with a pixel-interpolation method may not be perceived in some particular circumstances (e.g. a region with very dark or bright intensity or uniform texture, or a region with rich texture). The EC level of inter-coded slice may be calculated in a similar way. However, the method described above is computationally more efficient and more effective.

ROI_level calculation

The parameter ROI_level can have two values. "0" denotes that the slice is not ROI, and "1" denotes that the slice is ROI. Methods for defining ROIs are known. E.g. if a slice contains an attention-sensitive region of interest, such as eyes and/or mouth, the slice ROI_level is "1". Otherwise, the slice ROI_level is "0". Any existing ROI segmentation (also known as saliency mapping) method may be used here. In another embodiment, if the encoder is configured to use FMO slice mode of "foreground and background", where foreground is ROI and background is not, then the foreground slice has ROI_level of "1", and the background slice has ROI_level of "0".

EP_level calculation

Exemplarily, an error propagation attenuation (EP) level is calculated as follows. For intra-coded slice, the EP level of each slice is set to "0", because all MBs are intra-coded, and there is no error propagated from previous frames. For inter-coded slices, decode it to get the number of the intra-coded MBs; calculate the ratio of intra MBs to the total MBs of the slice, denoted as IRR. The EP level of each slice is set according to the value of IRR. E.g. if 4 bits are used to represent IRR levels, then there are 16 levels of $\{(2n+1)/32, n=0, \ldots, 15\}$. The slice's IRR level is determined by rounding its IRR value to the corresponding IRR level. A frame's EP level can be determined in a similar way.

In the following, the calculation of the above-mentioned side information parameters for group level is described.

Group Temporal_Complexity_Level calculation

For a GOP or scene group or slice group (called collectively as group hereafter), the temporal complexity level is calculated from the "zero MV" ratio over the group, "average mean MV size" over the group and/or "uniformity of movement" in the group. The MV of each MB is obtained in the same way as described on slice level. The average zero MV ratio, denoted as Z, is calculated as the ratio of the number of zero MVs to the total MVs in the group:

$$Z = N_{MV,0}/N_{MV,total} \quad (10)$$

The average mean MV size, denoted as V, is calculated as the average of the mean size of the non-zero MVs within one slice/frame over the group, then normalized to the frame width. Using a threshold method, the temporal complexities are classified, e.g. into three levels: stationary (level 0), very large motion (level 2), others/medium (level 1).

Group Spatial_Complexity_Level calculation

For a GOP or scene group, the spatial complexity level is calculated by first applying an edge detection operator (e.g. Sobel operator) to each frame/slice of the group. Then the magnitude of the edges is manipulated to classify e.g. two or three levels: regions with smooth texture (level 0) or with rich texture (level 2). Additionally, a third level may be others/medium (level 1).

Group_ROI_level

The Group_ROI_level parameter is used only for slice groups (defined above). If a current slice group contains an attention-sensitive region, like eyes and mouth, its ROI_level is "1"; otherwise, it is "0".

It is to be noted that each of the above-described parameters may be used separately, or in any combination. While it has been found that generally the slice-level parameters cause a stronger effect than the group/GOP level parameters, this may depend on application related circumstances of an embodiment.

According to the described examples, numerous advantageous embodiments can be created. The below embodiments may be combined. Especially, method-related embodiments may evolve into apparatus-related embodiments.

Figure 3:
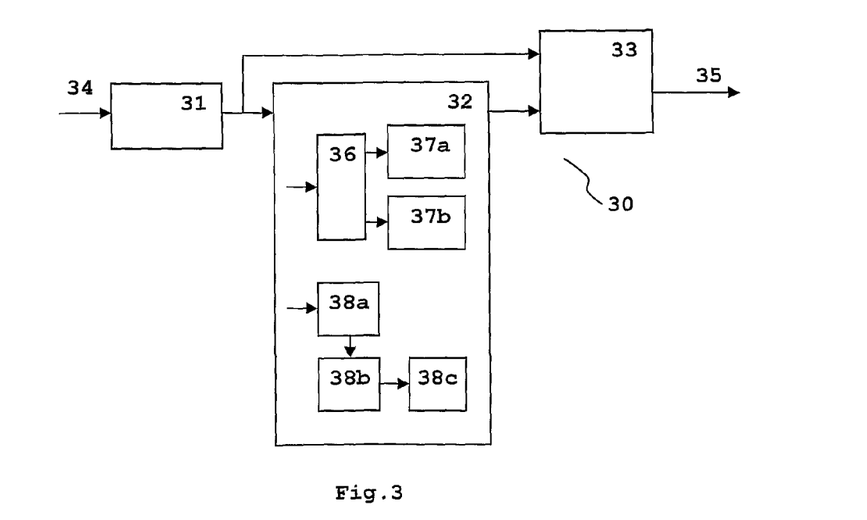
FIG. 3 a flow-chart of the method for enabling video quality assessment.

FIG. 3 shows a flow-chart of a method 30 for enabling video quality assessment. The video data are transmitted via a packet network and each frame of video data is represented by a variable number of packets. The method comprises steps of receiving 31 a sequence of packets 34 associated with the stream of frames of video data, generating 32 a set of parameters from said sequence of packets, and inserting 33 said generated set of parameters as side information into said stream of frames. The video data comprise at least one slice level, and the generated set of parameters comprises at least one parameter that refers individually to the slice level of the video (i.e. not to other slices). The set of parameters is suitable for generating an estimated mean opinion score (MOS) for the stream of frames of video data.

Figure 4:
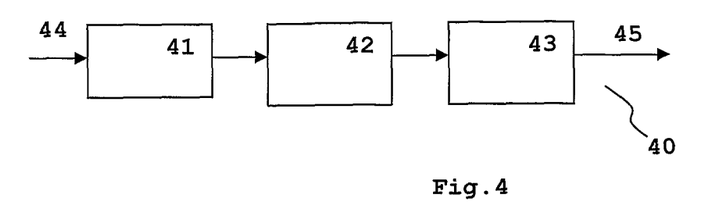
FIG. 4 a flow-chart of the method for assessing video quality.

FIG. 4 shows a flow-chart of a method 40 for assessing video quality. The video data are transmitted via a packet network and each frame of video data is represented by a variable number of packets. The method for assessing the quality of a stream of frames of video data comprises steps of receiving 41 a sequence of packets 44 associated with the stream of frames of video data, extracting 42 a set of parameters from said sequence of packets, and generating 43 an estimated mean opinion score 45 based on said set of parameters. The video data comprise at least one slice level, and the extracted set of parameters comprises at least one parameter that refers individually to the slice level (i.e. not to other slices) of the video.

In all embodiments, if a frame has more than one slice (denoted as slice levels), the set of parameters comprises at least one parameter that refers individually to a particular slice or slice level of the video (not to other slices/slice levels).

In one embodiment, the set of parameters further comprises at least one parameter that refers individually to a GOP level or scene group level of the video.

In one embodiment, a first parameter (EC_level) indicates an error concealment level for a slice. In one embodiment, the first parameter reflects motion and/or texture complexity of the slice, and, in a case where parameters are created, the step of generating the first parameter comprises using a first calculation method 37a (cf. FIG. 3) for generating the first parameter if the slice is intra-predicted, and using a different second calculation method 37b for generating the first parameter if the slice is inter-predicted. Further, a distinguishing or selection step 36 may be performed for selecting an EC type, e.g. distinguishing intra-predicted slices from inter-predicted slices for JVT JM decoders. In more advanced decoders, the two categories of EC methods are selected 36 not according to the slice types, but according to other features of the slice. The calculation of EC_level is aimed at distinguishing the EC effects caused by the content of a lost slice and the different EC methods applied to conceal a lost slice. As described above, in one embodiment the first calculation method 37a is used if the slice has more intra-MBs than inter-MBs, while the second calculation method 37b is used otherwise.

In one embodiment, a second parameter (ROI_level) indicates whether or not a slice contains a region-of-interest (ROI).

In one embodiment, a third parameter (EP_attenuation_level) indicates an error propagation attenuation level for a slice. In an embodiment where parameters are created, generating the third parameter in the generated set of parameters comprises for inter-coded slices calculating a ratio of intra-coded macroblocks and total number of macroblocks in the slice, wherein for intra-coded slices the third parameter is set to zero.

In one embodiment, a fourth parameter (size_in_MBs) indicates a number of macroblocks in a slice.

In one embodiment, a fifth parameter (temporal_complexity_-level) indicates a temporal complexity level for a GOP or scene group. In an embodiment as shown in FIG. 3, where parameters are created, the step of generating the fifth parameter in the generated set of parameters comprises sub-steps of determining 38a a ratio of zero motion vectors for the GOP or scene group, classifying 38b the GOP or scene group into one of at least three motion levels, the motion levels comprising at least a stationary level, a medium motion level and a very large motion level, and generating 38c the fifth parameter for the GOP or scene group in accordance with the motion level into which it was classified.

In one embodiment, a sixth parameter (spatial_complexity_-level) indicates a spatial complexity level for a GOP or scene group, wherein edge detection is used in each slice or frame of the GOP or scene group, and according to the amount of edges the GOP or scene group is classified into one of at least two spatial complexity levels, the levels corresponddding to smooth texture and rich texture.

In one embodiment, a seventh parameter (group_ROI_level) indicates a group ROI_level for a slice group in a GOP or scene group, indicating whether or not corresponding slices in the GOP or scene group contain a region-of-interest (ROI).

Figure 5:
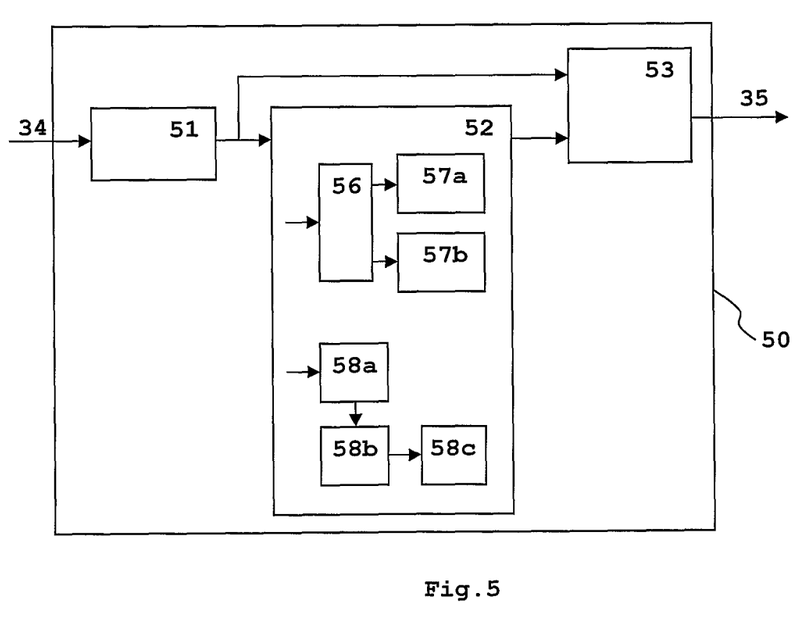
FIG. 5 a block diagram of a device for enabling video quality assessment.

In one embodiment, as shown in FIG. 5, an apparatus 50 for enabling quality assessment of a stream of frames of video data, wherein the video data are transmitted via a packet network and each frame of video data is represented by a variable number of packets, comprises the following: receiving means 51 for receiving a sequence of packets associated with the stream of frames of video data, computing means 52 for generating a set of parameters from said sequence of packets, the set of parameters being suitable for generating an estimated mean opinion score for the stream of frames of video data, and inserting means 53 for inserting said generated set of parameters as side information into said stream of frames. The video data comprise a slice level and the generated set of parameters comprises at least one parameter that refers to the slice level of the video. The receiving means 51 may be an input stage, a receiver, a connector etc. The computing means 52 may be a (micro-)processor, software execution unit, calculation unit etc. The inserting means 53 may be a multiplexer, arbiter or similar.

FIG. 5 shows an embodiment that further comprises a distinguishing unit 56 for distinguishing between inter-coded slices and intra-coded slices, a first calculation unit 57a for generating the first parameter if the slice is intracoded and a second calculation unit 57b for generating the first parameter if the slice is inter-coded.

Further, the embodiment shown in FIG. 5 comprises, for generating the fifth parameter in the generated set of parameters, first determining means 58a for determining a ratio of zero motion vectors for the GOP or scene group, classifying means 58b for classifying the GOP or scene group into one of at least three motion levels, the motion levels comprising at least a stationary level, a medium motion level and a very large motion level, and generating means 58c for generating said fifth parameter for the GOP or scene group in accordance with the motion level into which it was classified.

Figure 6:
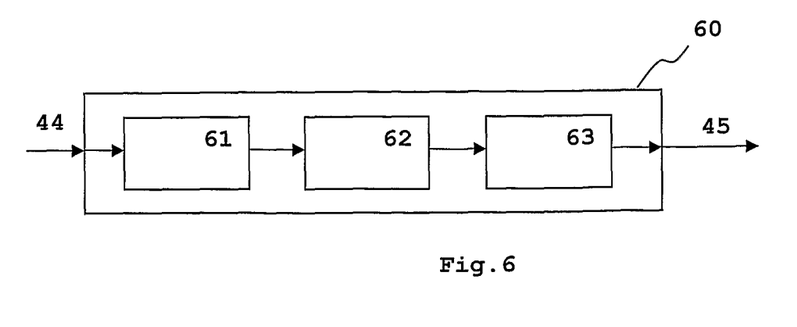
FIG. 6 a block diagram of a device for assessing video quality.

In one embodiment, as shown in FIG. 6, an apparatus 60 for assessing the quality of a stream of frames of video data is disclosed. The video data 44 are transmitted via a packet network and each frame of video data is represented by a variable number of packets. The apparatus 60 for assessing the quality of a stream of frames of video data comprises the following:

receiving means 61 for receiving a sequence of packets associated with the stream of frames of video data, extraction means 62 for extracting a set of parameters from said sequence of packets, and computing means 63 for generating an estimated mean opinion score 45 based on said set of parameters. The video data comprise a slice level, and the extracted set of parameters comprises at least one parameter that refers to the slice level of the video.

In one embodiment, a computer executable program for a video quality estimation device is provided that causes a computer of the device to execute a method according to any of the claims 1-13. In one embodiment, a computer readable recording medium has recorded thereon said computer executable program.

The invention can be used in packet-layer VQM models, before transmission or after reception of a packetized video signal. Another usage of the side information (i.e. inserted parameters) is that, in case of network congestion, a network element, e.g. router, can use these parameters to estimate end-user quality and determine which packets to discard, while maintaining optimal end user's perceived video quality.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

It will be understood that the present invention has been described purely by way of example, and modifications of detail can be made without departing from the scope of the invention.

Each feature disclosed in the description and (where appropriate) the claims and drawings may be provided independently or in any appropriate combination. Features may, where appropriate be implemented in hardware, software, or a combination of the two. Reference numerals appearing in the claims are by way of illustration only and shall have no limiting effect on the scope of the claims.

What is claimed is:

1. A method for enabling quality assessment of a stream of frames of video data, wherein the video data are transmitted via a packet network and each frame of video data is represented by a variable number of packets, the method comprising:

receiving a sequence of packets associated with the stream of frames of video data;

generating a set of parameters from said sequence of packets, the set of parameters being suitable for generating an estimated mean opinion score for the stream of frames of video data, one parameter of said generated set of parameters comprising a parameter indicating an error propagation attenuation level for a slice, said generating of said parameter indicating an error propagation attenuation level comprises, for inter-coded slices, calculating a ratio of intra-coded macroblocks and total number of macroblocks in the slice, and wherein for intra-coded slices the parameter is set to zero; and inserting said generated set of parameters as side information into said stream of frames;

wherein the video data comprise a slice level and wherein the generated set of parameters comprises at least one parameter that refers individually to the slice level of the video.

2. The method according to claim 1, wherein said set of parameters further comprise at least one parameter that refers individually to image content of a GOP level or scene group level of the video.

3. The method according to claim 2, wherein a fourth parameter indicates a temporal complexity level for a GOP or scene group.

4. The method according to claim 3, wherein generating the fourth parameter in the generated set of parameters comprises determining a ratio of zero motion vectors for the GOP or scene group;

classifying the GOP or scene group into one of at least three motion levels, the motion levels comprising at least a stationary level, a medium motion level and a very large motion level; and generating said fourth parameter for the GOP nr scene group in accordance with the motion level into which it was classified.

5. The method according to claim 2, wherein a fifth parameter indicates a spatial complexity level for a GOP or scene group, wherein edge detection is used in each slice or frame of the GOP or scene group, and according to the amount of edges the GOP or scene group is classified into one of at least two spatial complexity levels, the levels corresponding to smooth texture and rich texture.

6. The method according to claim 2, wherein a sixth parameter indicates a group ROI level for a slice group in a GOP or scene group, indicating whether or not corresponding slices in the GOP or scene group contain a region-of-interest (ROI).

7. The method according to claim 1, wherein a first parameter indicates an error concealment level for a slice.

8. The method according to claim 7, wherein the first parameter reflects motion and/or texture complexity of the slice, and wherein, the generating the first parameter in the generated set of parameters comprises determining whether the slice is intra-predicted or inter-predicted;

using a first calculation method for generating said first parameter if the slice is intra-predicted; and using a different second calculation method for generating said first parameter if the slice is inter-predicted.

9. The method according to claim 1, wherein a second parameter indicates whether or not a slice contains a region-of-interest.

10. The method according to claim 1, wherein a third parameter indicates a number of macroblocks in a slice.

11. A method for assessing the quality of a stream of frames of video data, wherein the video data are transmitted via a packet network and each frame of video data is represented by a variable number of packets, the method comprising:

receiving a sequence of packets associated with the stream of frames of video data;

extracting a set of parameters from said sequence of packets, at least one of said set of parameters comprising a parameter indicating an error propagation attenuation level for a slice; and generating an estimated mean opinion score based on said set of parameters;

wherein the video data comprise a slice level and wherein the extracted set of parameters was generated and inserted into said sequence of packets before transmitting the video data via the packet network and comprises at least one parameter that refers individually to the slice level of the video;

wherein the parameter indicating an error propagation attenuation level for a slice in the extracted set of parameters comprises, for inter-coded slices, a calculation of a ratio of intra-coded macroblocks and total number of macroblocks in the slice, and wherein for intra-coded slices the parameter indicating an error propagation attenuation level for a slice is set to zero.

12. The method according to claim 11, wherein said set of parameters further comprise at least one parameter that refers individually to image content of a GOP level or scene group level of the video.

13. The method according to claim 11, wherein a first parameter indicates an error concealment level for a slice.

14. The method according to claim 13, wherein the first parameter reflects motion and/or texture complexity of the slice, and wherein the generating of the first parameter in the extracted set of parameters comprises
determining whether the slice is intra-predicted or inter-predicted;
using a first calculation method for generating said first parameter if the slice is intra-predicted; and
using a different second calculation method for generating said first parameter if the slice is inter-predicted.

15. The method according to claim 13, wherein a fourth parameter indicates a temporal complexity level for a GOP or scene group.

16. The method according to claim 15, wherein generating the fourth parameter in the generated set of parameters comprises:
determining a ratio of zero motion vectors for the GOP or scene group;
classifying the GOP or scene group into one of at least three motion levels, the motion levels comprising at least a stationary level, a medium motion level and a very large motion level; and
generating said fourth parameter for the GOP or scene group in accordance with the motion level into which it was classified.

17. The method according to claim 13, wherein a fifth parameter indicates a spatial complexity level for a GOP or scene group, wherein edge detection is used in each slice or frame of the GOP or scene group, and according to the amount of edges the GOP or scene group is classified into one of at least two spatial complexity levels, the levels corresponding to smooth texture and rich texture.

18. The method according to claim 13, wherein a sixth parameter indicates a group ROI level for a slice group in a GOP or scene group, indicating whether or not corresponding slices in the GOP or scene group contain a region-of-interest.

19. The method according to claim 11, wherein a second parameter indicates whether or not a slice contains a region-of-interest.

20. The method according to claim 11, wherein a third parameter indicates a number of macroblocks in a slice.

21. An apparatus for enabling quality assessment of a stream of frames of video data, wherein the video data are transmitted via a packet network and each frame of video data is represented by a variable number of packets, the apparatus comprising:
receiving means for receiving a sequence of packets associated with the stream of frames of video data;
computing means for generating, a set of parameters from said sequence of packets, the set of parameters being suitable for generating an estimated mean opinion score for the stream of frames of video data, one parameter of said generated set of parameters comprising a parameter indicating an error propagation attenuation level for a slice, said generating of said parameter indicating an error propagation attenuation level comprises, for inter-coded slices, calculating a ratio of intra-coded macroblocks and total number of macroblocks in the slice, and wherein for intra-coded slices the parameter is set to zero; and
inserting means for inserting said generated set of parameters as side information into said stream of frames;
wherein the video data comprise a slice level and wherein the generated set of parameters comprises at least one parameter that refers to the slice level of the video.

22. An apparatus for assessing the quality of a stream of frames of video data, wherein the video data are transmitted via a packet network and each frame of video data is represented by a variable number of packets, the apparatus comprising
receiving means for receiving a sequence of packets associated with the stream of frames of video data;
extraction means for extracting a set of parameters from said sequence of packets, at least one of said set of parameters comprising a parameter indicating an error propagation attenuation level for a slice: and
computing means for generating an estimated mean opinion score based on said set of parameters;
wherein the video data comprise a slice level and wherein the extracted set of parameters comprises at least one parameter that refers to the slice level of the video;
wherein the parameter indicating an error propagation attenuation level for a slice in the extracted set of parameters comprises, for inter-coded slices, a calculation of a ratio of intra-coded macroblocks and total number of macroblocks in the slice, and wherein for intra-coded slices the parameter indicating an error propagation attenuation level for a slice is set to zero.

23. An apparatus for enabling quality assessment of a stream of frames of video data, wherein the video data are transmitted via a packet network and each frame of video data is represented by a variable number of packets, the apparatus comprising:
a processor and an associated memory adapted to:
receive a sequence of packets associated with the stream of frames of video data;
generate a set of parameters from said sequence of packets, the set of parameters being suitable for generating an estimated mean opinion score for the stream of frames of video data, one parameter of said generated set of parameters comprising a parameter indicating an error propagation attenuation level for a slice, said generating of said parameter indicating an error propagation attenuation level comprises, for inter-coded slices, calculating a ratio of intra-coded macroblocks and total number of macroblocks in the slice, and wherein for intra-coded slices the parameter is set to zero; and insert said generated set of parameters as side information into said stream of frames;

wherein the video data comprise a slice level and wherein the generated set of parameters comprises at least one parameter that refers individually to the slice level of the video.

24. The apparatus according to claim 23, wherein said set of parameters further comprise at least one parameter that refers individually to image content of a GOP level or scene group level of the video.

25. The apparatus according to claim 24, wherein a fourth parameter indicates a temporal complexity level for a GOP or scene group.

26. The apparatus according to claim 25, wherein the processor and memory generate the fourth parameter in the generated set of parameters by further being adapted to:

determine a ratio of zero motion vectors for the GOP or scene group;

classify the GOP or scene group into one of at least three motion levels, the motion levels comprising at least a stationary level, a medium motion level and a very large motion level; and generate said fourth parameter for the GOP or scene group in accordance with the motion level into which it was classified.

27. The apparatus according to claim 24, wherein a fifth parameter indicates a spatial complexity level for a GOP or scene group, wherein edge detection is used in each slice or frame of the GOP or scene group, and according to the amount of edges the GOP or scene group is classified into one of at least two spatial complexity levels, the levels corresponding to smooth texture and rich texture.

28. The apparatus according to claim 24, wherein a sixth parameter indicates a group ROI level for a slice group in a GOP or scene group, indicating whether or not corresponding slices in the GOP or scene group contain a region-of-interest (ROI).

29. The apparatus according to claim 23, wherein a first parameter indicates an error concealment level for a slice.

30. The apparatus according to claim 29, wherein the first parameter reflects motion and/or texture complexity of the slice, and wherein the processor and memory are further adapted to generate the first parameter in the generated set of parameters by further being adapted to:

determine whether the slice is intra-predicted or inter-predicted;

use a first calculation method for generating said first parameter if the slice is intra-predicted; and use a different second calculation method for generating said first parameter if the slice is inter-predicted.

31. The apparatus according to claim 23, wherein a second parameter indicates whether or not a slice contains a region-of-interest.

32. The apparatus according to claim 23, wherein a third parameter indicates a number of macroblocks in a slice.

* * * * *